US009844928B2

(12) United States Patent
Duart et al.

(10) Patent No.: US 9,844,928 B2
(45) Date of Patent: Dec. 19, 2017

(54) HIGH LIMITING OXYGEN INDEX ELECTRICAL INSULATION LAMINATES

(71) Applicant: E I DU PONT DE NEMOURS AND COMPANY, Wilmington, DE (US)

(72) Inventors: Jean Claude Duart, St. Julien en Genevois (FR); Serge Rebouillat, Echenevex (FR); Radoslaw Szewczyk, Lodz (PL); Roger Curtis Wicks, South Chesterfield, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 249 days.

(21) Appl. No.: 14/726,725

(22) Filed: Jun. 1, 2015

(65) Prior Publication Data

US 2015/0360452 A1    Dec. 17, 2015

Related U.S. Application Data

(60) Provisional application No. 62/012,524, filed on Jun. 16, 2014.

(51) Int. Cl.

| | | |
|---|---|---|
| *B32B 15/088* | (2006.01) | |
| *B32B 27/34* | (2006.01) | |
| *C08L 77/00* | (2006.01) | |
| *B32B 27/08* | (2006.01) | |
| *B32B 7/02* | (2006.01) | |
| *B32B 19/02* | (2006.01) | |
| *B32B 19/04* | (2006.01) | |
| *D21H 13/26* | (2006.01) | |
| *D21H 13/44* | (2006.01) | |
| *H01B 3/04* | (2006.01) | |

(52) U.S. Cl.
CPC ............ *B32B 27/34* (2013.01); *B32B 7/02* (2013.01); *B32B 19/02* (2013.01); *B32B 19/045* (2013.01); *B32B 27/08* (2013.01); *C08L 77/00* (2013.01); *D21H 13/26* (2013.01); *D21H 13/44* (2013.01); *H01B 3/04* (2013.01); *B32B 2250/24* (2013.01); *B32B 2260/021* (2013.01); *B32B 2260/023* (2013.01); *B32B 2262/0269* (2013.01); *B32B 2264/10* (2013.01); *B32B 2307/206* (2013.01); *B32B 2307/304* (2013.01); *B32B 2307/3065* (2013.01); *B32B 2307/54* (2013.01); *B32B 2457/00* (2013.01); *B32B 2457/04* (2013.01); *B32B 2605/10* (2013.01)

(58) Field of Classification Search
None
See application file for complete search history.

(56) References Cited

U.S. PATENT DOCUMENTS

| | | | |
|---|---|---|---|
| 3,063,966 A | | 11/1962 | Kwolek et al. |
| 3,227,793 A | | 1/1966 | Cipriani |
| 3,287,324 A | | 11/1966 | Sweeny |
| 3,414,645 A | | 12/1968 | Morgan, Jr. |
| 3,756,908 A | | 9/1973 | Gross |
| 3,767,756 A | | 10/1973 | Blades |
| 3,869,429 A | | 3/1975 | Blades |
| 3,869,430 A | | 3/1975 | Blades |
| 4,481,060 A | * | 11/1984 | Hayes ................. B32B 38/0036 156/309.9 |
| 5,028,300 A | * | 7/1991 | Hollberg ................ D21H 17/00 162/109 |
| 5,050,241 A | * | 9/1991 | Flowers ............. A41D 31/0027 2/167 |
| 5,667,743 A | | 9/1997 | Tai et al. |
| 6,312,561 B1 | | 11/2001 | Forsten et al. |
| 6,991,845 B2 | | 1/2006 | Levit et al. |
| 2006/0046598 A1 | * | 3/2006 | Shah ......................... B32B 3/04 442/394 |

OTHER PUBLICATIONS

DuPont Nomex® 418 and 419 Technical Data Sheet, H-93498-5, Rev. 04/03, Copyright 2003.*

* cited by examiner

*Primary Examiner* — David Sample
*Assistant Examiner* — Nicole T Gugliotta

(57) ABSTRACT

Laminate structure suitable as electrical insulation comprising a mica-aramid layer of 35-55 wt % mica, 20-60 wt % binder, and 5 to 25 wt % aramid floc, the mica distributed uniformly in the mica-aramid layer; and an aramid layer comprising 35-75 wt % binder and 25-65 wt % aramid floc, the aramid layer being essentially free of mica; wherein the mica-aramid layer has a limiting oxygen index (LOI) of 37% or greater, and the aramid layer has a LOI of 30% or less and having a tensile strength and elongation greater than the mica-aramid layer; and the mica-aramid layer being homogeneously and continuously bound to the aramid layer; the laminate structure having a thickness of at least 0.10 mm, a LOI greater than 32%, and when exposed to a flame to determine LOI, the laminate burns as one piece.

15 Claims, No Drawings

HIGH LIMITING OXYGEN INDEX ELECTRICAL INSULATION LAMINATES

BACKGROUND OF THE INVENTION

Field of the Invention

The present invention relates to a laminate sheet structure suitable for use as electrical insulation in such things as motors and transformers. It is especially useful in on-board equipment used in railcars or railways in those jurisdictions that require electrical insulation having a limiting oxygen index (LOI) of greater than 32 percent (%).

Description of the Related Art

New European Standard EN 45545-2, published in 2013, defines fire safety requirements for materials used in railway equipment (rolling stock), including electrical insulation materials for traction transformers and inductors. Three categories of Hazard Level (HL) have been defined. For the highest fire safety level category (HL3), the required LOI for these materials must be higher than 32%.

Thin materials such as aramid electrical insulation papers, that have good mechanical properties (i.e., good tensile strength and elongation-at-break), can have an LOI of less than 32%, and certain inorganic additives to these papers can reduce its mechanical strength. Therefore there is a real need by rail equipment manufacturers for an electrical insulation solution that meets this high LOI limit while maintaining adequate mechanical properties.

To those skilled in the art, the term "mica paper" refers to sheet made with high concentrations of the inorganic mineral mica, generally in an amount that is at least 90 weight percent or greater, with the remainder being a binder that provides some mechanical integrity to paper. However, the resulting mica paper is not a strong paper.

U.S. Pat. No. 6,991,845 to Levit et al. discloses a sheet structure for electrical insulation or flame resistance comprising a barrier ply having a mica-rich face and a mica-poor face and a reinforcing ply containing a saturable backing layer attached to the mica-poor face of the barrier ply. The mica content of the mica-rich face is at least 60 weight percent based on the total components in the mica-rich face. In a preferred embodiment, the mica-rich face has greater than 85 weight percent mica by weight, based on the total components in the mica-rich face.

U.S. Pat. No. 6,991,845 to Levit et al. and U.S. Pat. No. 6,312,561 to Forsten et al. disclose an aramid-mica blended paper made from a homogenous blend of m-aramid fiber, m-aramid fibrids, and mica. Levit et al. further teaches that this "aramid-mica paper" has superior mechanical properties when compared to "mica paper" and can be used without any backing reinforcement.

SUMMARY OF THE INVENTION

This invention relates to a laminate structure suitable for use as electrical insulation in on-board equipment such as in railcars or railways, comprising a mica-aramid layer of comprising 35 to 55 weight percent mica, 20 to 60 weight percent of a first binder, and 5 to 25 weight percent of a first aramid floc, based on the amount of mica, first binder, and aramid floc in the mica-aramid layer, the mica being distributed uniformly in the mica-aramid layer, the mica-aramid layer having a first and second face; and an aramid layer comprising 35 to 75 weight percent of a second binder and 25 to 65 weight percent of a second aramid floc, based on the amount of second binder and second floc in the aramid layer, the aramid layer being essentially free of mica, the aramid layer having a first and second face; wherein the mica-aramid layer by itself has a limiting oxygen index (LOI) of 37 percent or greater, and the aramid layer by itself has a LOI of 30 percent or less, the aramid layer having a tensile strength and elongation greater than the mica-aramid layer; and wherein the first or second face of the mica-aramid layer is homogeneously and continuously bound to the first face of the aramid layer; the laminate structure further having a thickness of at least 0.10 mm, a LOI of greater than 32 percent, and when exposed to a flame in an oxygen environment to determine LOI, the laminate structure burns as one piece.

This invention further relates to a laminate having another mica-aramid layer homogeneously and continuously bound to the second face of the aramid layer.

DETAILED DESCRIPTION

This invention relates to a laminate structure comprising a mica-aramid layer attached to an aramid layer, the laminate structure having a limiting oxygen index of greater than 32 percent. In some embodiments, the limiting oxygen index is greater than 35 percent. The limiting oxygen index (LOI) is the minimum concentration of oxygen, expressed as a percentage, that will support combustion of a specimen in a defined normalized manner. It is measured by passing a mixture of oxygen and nitrogen over a specimen, and adjusting the oxygen level until the specimen just supports combustion. As used herein, LOI is measured according to ISO 4589-2.

The mica-aramid layer in the laminate, measured by itself, has a LOI of 37 percent or greater, more preferably 40 percent or greater, and most preferably 42 percent or greater. The aramid layer in the laminate, measured by itself, has a LOI of 30 percent or less.

The inventors have found that, when a laminate structure is made by homogeneously and continuously binding a face of the higher LOI mica-aramid layer to a face of the lower LOI aramid layer, and then exposing the laminate structure to a flame in an oxygen environment to determine the LOI of the laminate structure, the laminate structure burns as one piece. That is, the laminate structure burns as if the entire laminate was made of a single material. This is a surprising result, because one could expect the lower LOI layer would support combustion at its lower LOI level and burn off the higher LOI layer. Therefore, it is believed the two layers work synergistically together, with the mica-aramid layer absorbing energy from the flame and in essence protecting the lower LOI layer or retarding its flammability.

The mica-aramid layer comprises 35 to 55 weight percent mica, 20 to 60 weight percent of a first binder, and 5 to 25 weight percent of a first aramid floc, based on the amount of mica, first binder, and aramid floc in the mica-aramid layer. In some preferred embodiments, the mica-aramid layer comprises 45 to 50 weight percent mica, 35 to 45 weight percent of a first binder, and 10 to 15 weight percent of a first aramid floc, based on the amount of mica, first binder, and aramid floc in the mica-aramid layer. In some embodiments the total weight of binder and aramid floc in the mica-aramid layer is greater than the weight of mica. The mica is distributed uniformly in the plane of the mica-aramid layer. The mica-aramid layer necessarily has a first and second face, and either face can be attached to a face of the aramid layer. Mica particles, normally in the form of a flake of various types, such as muscovite or phlogopite or blends thereof, can be used in the mica-aramid layer; however, mica of the muscovite type is preferred.

It is believed the properties of final laminate structure will be negatively impacted that if the mica-aramid layer has more than 55 weight percent mica. First, on a constant weight basis, the tensile strength of the mica-aramid layer decreases as the amount of mica in that layer increases, and layers having more than 55 weight percent mica have a lower strength than layers having the claimed amount of mica. Second, for the purposes of improved LOI, it is preferred that the mica be distributed homogeneously in the plane of the mica-aramid layer. It is believed that having 55 weight percent mica or less in the mica-aramid layer encourages this homogeneous distribution by creating a discontinuous distribution of the mica in the mica-aramid layer. In other words, the lower content of mica discourages formation of a continuous barrier layer of mica as would be the case with high content mica layers. Further, it is believed that if the mica-aramid layer has less than 35 weight percent mica, there is not enough mica present in that layer to absorb an adequate amount of energy during LOI testing to create a laminate structure that has an LOI of greater than 32 percent.

The aramid layer comprises 35 to 75 weight percent of a second binder and 25 to 65 weight percent of a second aramid floc, based on the amount of second binder and second floc in the aramid layer. In some preferred embodiments the aramid layer comprises 40 to 60 weight percent of a second binder and 40 to 60 weight percent of a second aramid floc, based on the amount of second binder and second floc in the aramid layer. In some preferred embodiments the aramid layer has more binder than floc. The aramid layer is selected such that, by itself, it has mechanical properties (tensile strength and elongation-at-break) that are greater than the mica-aramid layer. The use of this aramid layer provides higher mechanical strength to the laminate structure, which is desireable when it is used as electrical insulation in transformers, motors, and other devices. On an equal weight basis, a multilayered laminate structure as claimed, comprising the aramid layer, has superior mechanical strength when compared to a structure having only one layer of mica-aramid. Preferably, the aramid layer is free of, or essentially free of, any mica. As used herein, "essentially free" means the aramid layer functions thermally and mechanically as though no mica is present in the layer, even if some trace amounts of mica contamination are present in that aramid layer.

The first and second binders of the mica-aramid layer and the aramid layer can be the same or different. In a preferred embodiment the same binder is used in both layers. While the binder(s) can be any chemical or treatment or additive known in the art to bind floc or fibrous material to form a paper, in one preferred embodiment the binder is a binder particle, preferably a particle having a filmy structure. The preferred binder particle is a fibrid, and the preferred fibrid is an aramid fibrid. The first and second aramid floc of the mica-aramid layer and the aramid layer can also be the same or different. In a preferred embodiment the same aramid floc is used in both layers.

The term "floc", as used herein, means fibers that are cut to a short length and that are customarily used in the preparation of wet-laid sheets and/or papers Typically, floc has a length of from about 3 to about 20 millimeters. A preferred length is from about 3 to about 7 millimeters. Floc is normally produced by cutting continuous fibers into the required lengths using well-known methods in the art.

The term "aramid", as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other polymeric material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The preferred aramid is a meta-aramid. The aramid polymer is considered a meta-aramid when the two rings or radicals are meta oriented with respect to each other along the molecular chain. The preferred meta-aramid is poly (meta-phenylene isophthalamide) (MPD-I). U.S. Pat. Nos. 3,063,966; 3,227,793; 3,287,324; 3,414,645; and 5,667,743 are illustrative of useful methods for making aramid fibers that could be used to make aramid floc.

Alternatively, the aramid floc could be a para-aramid or an aramid copolymer. The aramid polymer is considered a para-aramid when the two rings or radicals are para oriented with respect to each other along the molecular chain. Methods for making para-aramid fibers are generally disclosed in, for example, U.S. Pat. Nos. 3,869,430; 3,869,429; and 3,767,756. One preferred para-aramid is poly(paraphenylene terephthalamide); and one preferred para-aramid copolymer is copoly(p-phenylene/3,4'diphenyl ester terephthalamide).

The preferred aramid floc is a meta-aramid floc, and especially preferred is floc made from the meta-aramid poly(meta-phenylene isophthalamide) (MPD-I).

The term "fibrids", as used herein, means very small, nongranular, fibrous or film-like particles with at least one of their three dimensions being of minor magnitude relative to the largest dimension. These particles are prepared by precipitation of a solution of polymeric material using a non-solvent under high shear. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly(meta-phenylene isophthalamide) (MPD-I).

Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into the layers while the fibrids are in a never-dried state.

The term "layer", preferably refers to a thin planar material of a specific composition sometimes described as a "paper". The term "layer" also refers to a paper made from a plurality of thin planar webs attached together wherein all the planar webs have the same composition. Alternatively, a "layer" can be a thin planar material (or pluarality thereof) of a specific composition that is combined with another "layer" that is also a thin planar material (or plurality of) but of a different composition in a multilayered paper. As used herein, the term "face" refers to either of the two major surfaces of the layer or paper (i.e., one side or the other of the layer or paper).

In some embodiments, an individual mica-aramid layer has a thickness of 0.5 millimeters or less. In some other embodiments, an individual mica-aramid layer has a thickness of 0.25 millimeters or less. In one preferred embodiment an individual mica-aramid layer has a thickness of 0.13 millimeters or less; in other preferred embodiments an individual mica-aramid layer has a thickness of 0.1 millimeters or less. Further, it is believed that an individual mica-aramid layer should have a thickness of at least 0.06 millimeters to provide adequate mica to the laminate.

In some other embodiments, an individual aramid layer has a thickness of 0.15 millimeters or less. In one preferred embodiment an individual aramid layer has a thickness of 0.1 millimeters or less; in other preferred embodiments an individual aramid layer has a thickness of 0.05 millimeters or less. It is believed that an individual aramid layer should have a thickness of at least 0.03 millimeters to provide adequate tensile strength to the laminate.

Further in one preferred embodiment, the aramid layer, as used to make the laminate structure, and/or as measured by inspection in the final laminate structure, is thinner than the mica-aramid layer. In some embodiments, the mica-aramid layer, as used to make the structure, and/or as measured by inspection in the final laminate structure is at least 1.5 times as thick as the aramid layer.

A first or second face of the mica-aramid layer is homogeneously and continuously bound to a first face of the aramid layer to form a laminate structure that when exposed to a flame in an oxygen environment to determine LOI, the laminate structure burns as one piece. Homogeneously bound means the entire surface of a face of the mica-layer is attached uniformly to the entire surface of a face of the aramid layer, and continuously bound means the attachment is continuous across each face of each layer without any visual gaps in attachment or visual discrete regions of non-attachment. In other words, in the final laminate, the face of the mica-aramid layer continuously and uniformly contacts and is bound to the face of the aramid layer, either through an adhesive continously applied to one or both of the layers or by binders uniformly distributed in the layers.

In one embodiment, the mica-aramid layer is bound to the aramid layer by use of a layer of adhesive. In one practice of this embodiment, the mica-aramid layer and the aramid layer are made separately and then combined with a layer of adhesive provided in between. Each of the mica-aramid layer and the aramid layer can be made separately on a paper-making machine by providing the desired amount and proportion of mica and/or aramid solids to the headbox and then wet-laying as a web onto a papermaking wire. The wet web can then be dried on dryer drums to form a paper. Preferably the paper is then further calendered in the nip of a hot roll calender under pressure and heat, or by other means, to consolidate and densify the paper into a layer having the desired thickness. If desired, two or more lighter basis weight or thinner wet webs or papers of the same composition can be made separately and then calendered and consolidated together into a single mica-aramid layer or a single aramid layer. When adhesives are used, in a preferred embodiment each of the mica-aramid layer and the aramid layer are calendered separately prior to being combined with adhesive.

Useful adhesives include but are not limited to adhesives based on such things as polyurethanes, epoxies, polyimides, phenolics, melamines, alkyds, polyesters, polyesterimides, benzoxazines, silicones and combinations thereof. In this embodiment, to homogeneous and continuously bind the face of the mica-aramid layer to the face of the aramid layer, the adhesive is applied to at least one face of a layer in a relatively uniform manner. The adhesive can be applied to either the mica-aramid layer or the aramid layer using any method that provides a uniform continuous application of adhesive to one side of the layer without gaps; such methods include those that involve roll coating or blade coating or spray coating. Preferably the adhesive is applied to a uniform thickness, and preferably the adhesive is continuous and has a uniform thickness in the laminate. Alternatively, the adhesive can be provided in a sheet form inserted between the mica-aramid layer and the aramid layer. The mica-aramid layer, adhesive, and aramid layer are then pressed together, with the adhesive positioned in between the other two layers, using any method that can press or consolidate the layers together. Such methods could include nipping the two layers (with adhesive between) in the nip(s) of a set of calender rolls. This consolidates the layers into a laminate structure having the desired thickness and fully binds the mica-aramid and aramid layers together. If needed, the adhesive can be additionally cured using heat applied before, after, or while the layers are pressed under pressure.

Alternatively, the first or second face of the mica-aramid layer is homogeneously and continuously bound to a first face of the aramid layer to form the laminate structure by the first and/or second binder(s) in those respective layers, in other words, without the application of additional adhesive provided between the layers. It is believed this can be accomplished in at least two methods, which are not intended to be limiting.

The first method can be achieved using a paper-making machine equipped with two headboxes for forming a layered paper. Two different slurries having the desired proportions of mica and/or aramid solids are provided to the two headboxes and the two slurries are then wet-laid as multi-layered webs onto a papermaking wire with, for example, the aramid layer being formed on the papermaking wire and the mica-aramid layer being formed on top of the aramid layer. This creates a single weak wet web having a mica-aramid layer and an aramid layer The wet web can then be dried on dryer drums to form a paper. Preferably the paper is then further calendered in the nip of a hot roll calender under pressure and heat, or by other means, to consolidate and densify the structure into a laminate structure having the desired thickness and fully bind the two layers together. Since no additional adhesive is used, the first binder that is exposed to or is present on the face of the mica-aramid layer, and/or the second binder that is exposed to or is present on the face of the aramid layer in contact with the face of the mica-aramid layer help to bind the two layers together homogenously and continuously.

The second method of homogeneously and continuously binding the first or second face of the mica-aramid layer to a first face of the aramid layer to form the laminate structure, by the first and/or second binder(s) in those layers, can be achieved by the following embodiment. Each of the mica-aramid layer and the aramid layer can be made separately on a paper-making machine by providing the desired amount and proportion of mica and/or aramid solids to the head box and then wet-laying as a web onto a papermaking wire. The wet web can then be dried on dryer drums to form separate mica-aramid and aramid layers. Since additional adhesives are not used, in a preferred embodiment each of the mica-aramid layer and the aramid layer are not consolidated or calendered separately prior to being combined. Then a face of the mica-aramid is then placed adjacent against and in contact with a face of the aramid layer and the combined layers are pressed together using any method that can press or consolidate the layers together. Such methods can include pressing the layers together in the nip of a hot roll calender under pressure and heat, or by other means, to consolidate the structure into a laminate structure having the desired thickness and fully bind the two layers together. Since no additional adhesive is used, the first binder that is exposed to or is present on the face of the mica-aramid layer, and/or the second binder that is exposed to or is present on the face of the aramid layer in contact with the face of the mica-aramid layer help to bind the two layers together homogenously and continuously.

The laminate structure comprises a mica-aramid layer, an aramid layer, and optionally, an adhesive layer positioned in between the those layers. In a preferred embodiment, the final laminate structure consists essentially of, or only of, those three layers. In a most preferred embodiment, the final laminate structure consists essentially of, or only of, the mica-aramid layer and the aramid layer.

In an alternate embodiment, the laminate structure comprises a mica-aramid layer, an aramid layer, and another mica-aramid layer. Optionally, the laminate has two additional adhesive layers, one each positioned in between each of the mica-aramid layers and the aramid layer. These adhesive layers can be the same or different, but are preferentially the same. In a preferred version of this embodiment, the laminate structure consists essentially of, or only of, those five layers. In a most preferred embodiment, the final laminate structure consists essentially of, or only of, in order, the mica-aramid layer, the aramid layer, mica-aramid layer. The two mica-aramid layers can be the same or different, having different thicknesses, binders, and/or aramid flocs as long as each of the mica-aramid layers have the composition previously stated herein (comprising 35 to 55 weight percent mica, 20 to 60 weight percent of a first binder, and 5 to 25 weight percent of a first aramid floc, based on the amount of mica, first binder, and aramid floc in the mica-aramid layer) or preferred versions thereof.

In this alternative embodiment, a first or second face of the mica-aramid layer is homogeneously and continuously bound to a first face of the aramid layer and the other mica-aramid layer is homogeneously and continuously bound to the second face of the aramid layer. In one embodiment, the layers are bound together with an adhesive, applied as previously stated herein. In another embodiment, the layers are bound together by the first and/or second binder(s) in those layers, made in a manner similar to those as previously stated herein. In another embodiment the layers can be bound using a combination of adhesive and/or first and/or second binder(s) in those layers. The various layers can be combined at one time, or individual layers can be added sequentially.

The final laminate structure, regardless of the number of layers, has a thickness of at least 0.1 mm. In some embodiments the final laminate structure has a thickness of from about 0.1 mm to about 1.5 mm. In some preferred embodiments the thickness of the final laminate structure, containing one each of the mica-aramid and aramid layers, is about 0.75 mm or less. In some preferred embodiments, the thickness of the final laminate structure, containing two mica-aramid layers and one aramid layers, is about 1.35 mm or less. In some embodiments the thickness of the mica-aramid layer in the final laminate structure is two-thirds or less of the total thickness of final laminate structure. In some embodiments the thickness of the aramid layer in the final laminate structure is one-third or less the total thickness of the final laminate structure.

The final laminate structure has a tensile strength of at least 38 N/mm$^2$ and preferably at least 40 N/mm$^2$, and an elongation-at-break of at least 4 percent, preferably at least 4.5 percent. It is believed that tensile strengths as high as 80 N/mm$^2$ and elongations as high as 15 percent are useful in electrical insulation.

While the mica-aramid layer and aramid layer used in the laminate structure preferentially consist exclusively of mica and/or aramid materials, if desired other materials can be included. Preferentially those materials are thermostable. By thermostable it is meant that the given material can withstand a long exposure to a desired elevated end-use temperature without significant degradation (usually, to retain at least 50% of its initial mechanical strength properties after exposure for 100,000 hours to the elevated temperature.)

In use, the laminate structure can be impregnated with resin, using several possible methods. One common method comprises impregnating the laminate structure with resin after it has been inserted into, or wound around, the item to be insulated. The resin is then cured. A second common method comprises impregnating the laminate structure with resin prior to it being inserted into or wound around the item to be insulated, and then curing the resin.

While the laminate structure is believed to have immediate use in transformers and other equipment for the rail industry, other uses and applications are possible, including but not limited to such things as industrial motors, wind turbine generators, and industrial power inverters.

Test Methods

Tensile Properties. The tensile properties of the layers and laminate structure can be measured in accordance with ISO 1924-2 "Paper and board—Determination of tensile properties; Part 2: Constant rate of elongation method". Zwick equipment was used for mechanical measurements using samples cut to size of 20±0.1 mm×290 mm. The sample clamping distance was 180±1 mm and applied clamping speed was 20 mm/min. All samples were tested for tensile strength and elongation at room temperature.

Limiting Oxygen Index. The test procedure and sample preparation can be in accordance to standard ISO 4589-2. The standard describes different forms and shapes of tested material samples depending on form of the material (rigidity, thickness). The specimen form No. V was selected and a sample with dimensions 140×52 mm was held vertically between stainless steel forks in the center of glass test chimney. Chimney dimensions were 450×80 mm. The gas supply to the chimney was provided with oxygen and nitrogen thoroughly mixed at the base of the chimney. Variation of oxygen concentration in the gas mixture was <0.2% (V/V). The propane flame igniter projected the flame 16±4 mm vertically downwards, and the propagation ignition procedure was used, i.e. the igniter produced burning across the top and partially down the vertical faces of the specimen (approx. 6 mm of the vertical faces). The igniter was applied for up to 30 seconds until the sample burned steadily.

Thickness. The thickness of the layers and laminate structure can be determined by measuring the thickness of a sample in accordance with ASTM D 645/D 645-M-96.

Example 1

A laminate structure utilizing an adhesive is made in the following manner. A mica-aramid layer "A" having about 48 wt % mica, about 37 wt % binder, and about 15 wt % aramid floc is made by forming an aqueous dispersion containing a mixture muscovite-type mica, MPD-I floc, and MPD-I fibrids in the desired proportions. The MPD-I fibrids are made as generally described in U.S. Pat. No. 3,756,908. The MPD-I floc has a linear density 0.22 tex and a length of 0.64 cm and is made from fiber sold by E. I. du Pont de Nemours and Company under the trade name NOMEX®.

The dispersion is pumped through a headbox of a Fourdrinier-type papermaking machine and a wet-laid web is formed. The web is dried to form an unconsolidated mica-aramid layer. The unconsolidated mica-aramid layer is then run through the hot pressurized nip of a calender to consolidate the mica-aramid layer to a thickness of 0.08 mm. As a control, a mica-aramid layer "AC" is made in a similar manner but having a thickness of 0.13 mm.

A aramid layer "B" having about 55 wt % binder and about 45 wt % aramid floc (having no mica) is made in a similar manner, with the binder being again MPD-I fibrids and the floc being MPD-I floc as before. An unconsolidated aramid layer is made on the papermaking machine and is then run through the hot pressurized nip of a calender to consolidate the aramid layer to a thickness of 0.04 mm. As a control, an aramid layer "BC" is made in a similar manner but having a thickness of 0.13 mm.

The aramid layer is placed on flat surface and a solvent-based two component polyurethane crosslinking adhesive (Herberts-EPS 7146 with 10% hardener Z) is uniformly applied to the face of the aramid layer. The mica-aramid layer is then placed on top of the adhesive and a round metallic rod is used to further uniformize the application of adhesive. The combination of aramid layer, adhesive, and mica-aramid layer is then fed into an electric hot press operating at 100° C. for 10 minutes to cure and form a laminate structure having an final thickness of 0.13 mm, the adhesive providing roughly 0.01 mm in thickness. The laminate structure is then conditioned in air for 24 hours prior to testing. The laminate structure along with mica-aramid layer "A", Control "AC", aramid layer "B" and Control "BC" are then tested for LOI and mechanical properties. Results are shown in the Table. The laminate structures burn as one piece.

TABLE

| Sample | Thickness (mm) | LOI (%) | Tensile Strength (N/mm²) | Elongation at Break (%) |
| --- | --- | --- | --- | --- |
| A | 0.08 | 44.7 | 29.4 | 3.2 |
| AC | 0.13 | 46.7 | 30.1 | 1.6 |
| B | 0.04 | 26.0 | 60.9 | 6.7 |
| BC | 0.13 | 29.0 | 56.1 | 11.4 |
| Example 1 | 0.13 | 35.8 | 40.2 | 5.3 |

Example 2

A laminate structure having the same high representative LOI as Example 1 is made without utilizing an added adhesive in the following manner. The aqueous dispersions for the mica-aramid layer and the aramid layer of Example 1 are pumped through primary and secondary headboxes of a Fourdrinier-type papermaking machine and a multilayered wet-laid web is formed with a mica-aramid layer on the top and the aramid layer on the bottom next to the wire. The wet multilayered web is dried to form an unconsolidated laminate structure. The unconsolidated laminate structure is then run through the hot pressurized nip of a calender to consolidate the laminate structure to a thickness of 0.12 mm.

Example 3

A laminate structure having the same high representative LOI as Example 1 is made without utilizing an added adhesive in the following manner. The unconsolidated mica-aramid layer and the unconsolidated aramid layer of Example 1 are made and are laid one on top of the other. The combined stack of layers is then run through the hot pressurized nip of a calender to consolidate the layers into a laminate structure having a thickness of 0.12 mm.

Example 4

A five-layer laminate structure (utilizing adhesive) and a three-layer laminate (without utilizing adhesive), both having the same high LOI as Example 1, are made by utilizing the general procedures of Example 1 and Example 3 with the addition of another 0.08 mm thick mica-aramid layer "A" placed adjacent to the aramid layer. In other words, the aramid layer is sandwiched between the two mica-aramid layers, with and without adhesive. The resulting five-layer laminate has a thicknesses of 0.22 mm (the adhesive adding roughly 0.02 mm to the thickness), and the resulting three-layer laminate has a thicknesses of 0.20 mm.

What is claimed is:

1. A laminate structure suitable for use as electrical insulation in on-board equipment in railcars or railways, comprising:
   a) a mica-aramid paper layer comprising 35 to 55 weight percent mica, 20 to 60 weight percent of a first binder, and 5 to 25 weight percent of a first aramid floc, based on the amount of mica, first binder, and aramid floc in the mica-aramid paper layer, the mica being distributed uniformly in the mica-aramid paper layer, the mica-aramid paper layer having a first and second face; and
   b) an aramid paper layer comprising 35 to 75 weight percent of a second binder and 25 to 65 weight percent of a second aramid floc, based on the amount of second binder and second floc in the aramid paper layer, the aramid paper layer being essentially free of mica, the aramid paper layer having a first and second face;
   wherein the mica-aramid paper layer by itself has a limiting oxygen index (LOI) of 37 percent or greater, and the aramid layer by itself has a LOI of 30 percent or less, the aramid paper layer having a tensile strength and elongation greater than the mica-aramid layer; and
   wherein the first or second face of the mica-aramid paper layer is homogeneously and continuously bound to the first face of the aramid paper layer; the laminate structure further having:
   i) a thickness of at least 0.10 mm,
   ii) a LOI of greater than 32 percent, and
   iii) when exposed to a flame in an oxygen environment to determine LOI, the laminate structure burns as one piece.

2. The laminate of claim 1 having an LOI of greater than 35 percent.

3. The laminate structure of claim 1 wherein the mica-aramid paper layer is bound to the aramid paper layer by use of an adhesive.

4. The laminate structure of claim 1 wherein the mica-aramid paper layer is bound to the aramid paper layer by the first and/or second binder(s) in those layers.

5. The laminate structure of claim 1 wherein the first or second binder is an aramid fibrid.

6. The laminate structure of claim 1 wherein the first and second binder is the same binder.

7. The laminate structure of claim 1 wherein the first and second aramid floc is the same aramid floc.

8. The laminate structure of claim 1 further comprising another mica-aramid paper layer a) homogeneously and continuously bound to the second face of the aramid paper layer by use of an adhesive.

9. The laminate structure of claim 8 wherein the first and/or second binder is an aramid fibrid.

10. The laminate structure of claim 8 wherein the first and second binder is the same binder.

11. The laminate structure of claim 8 wherein the first and second aramid floc is the same aramid floc.

12. The laminate structure of claim 1 further comprising another mica-aramid paper layer a) homogeneously and continuously bound to the second face of the aramid paper layer by the first and/or second binder(s) in those layers.

13. The laminate structure of claim 12 wherein the first or second binder is an aramid fibrid.

14. The laminate structure of claim 12 wherein the first and second binder is the same binder.

15. The laminate structure of claim 12 wherein the first and second aramid floc is the same aramid floc.

\* \* \* \* \*